United States Patent [19]

Itoh et al.

[11] Patent Number: 4,919,810
[45] Date of Patent: Apr. 24, 1990

[54] POROUS MEMBRANE

[75] Inventors: Hajime Itoh, Hiroshima; Hiroshi Takahashi, Otake; Kouji Ohbori, Otake; Hideaki Habara, Otaka, all of Japan

[73] Assignee: Mitsubishi Rayon Co., Ltd., Tokyo, Japan

[21] Appl. No.: 54,894

[22] Filed: May 28, 1987

[30] Foreign Application Priority Data

May 30, 1986 [JP] Japan ................................ 61-126543

[51] Int. Cl.$^5$ ............................................. B01D 13/04
[52] U.S. Cl. ........................ 210/500.34; 210/500.35; 428/339; 428/520; 428/521; 428/522; 428/398; 428/376; 264/41
[58] Field of Search ............... 428/520, 339, 521, 522; 210/500.34, 500.35

[56] References Cited

U.S. PATENT DOCUMENTS 4,402,216 9/1983 Peterson .............................. 73/61.4
4,491,012 1/1985 Peterson .............................. 73/61.4
4,581,140 4/1986 Manabe et al. .................. 264/41 X

FOREIGN PATENT DOCUMENTS 0108601 5/1984 European Pat. Off. .

*Primary Examiner*—P. C. Ives
*Attorney, Agent, or Firm*—Oblon, Spivak, McClelland, Maier & Neustadt

[57] ABSTRACT

Disclosed is a porous membrane consisting of a film-forming polymer characterized in that:

(a) in at least one surface thereof, pores extending in a direction substantially perpendicular to the membrane surface are present at a surface pore density of 20 to 80%, said pores having an average pore diameter within the range of 0.01 to 100 μm, a ratio of major to minor axis within the range of 1.0 to 2.0, and a coefficient of variation of pore diameter within the range of 0 to 50%; and (b) the overall porosity of said porous membrane is within the range of 20 to 90%.

9 Claims, 4 Drawing Sheets

POROUS MEMBRANE

BACKGROUND OF THE INVENTION

(1) Field of the Invention

This invention relates to porous membranes useful, for example, in the filtration of fluids to remove any fine particles present therein.

(2) Description of the Prior Art

Various types of porous membranes are known in the prior art. They include (1) asymmetrical membranes which are made by the wet coagulation process and consist of a dense layer and a void layer; (2) homogeneous membranes which are made by forming a molten crystalline polyolefin and then cold-stretching the resulting preform, and include three-dimensionally interconnecting interstices surrounded by fibrils and knotted portions; and (3) porous membranes of the straight pore type which are made by bombarding a polymer film of, for example, polycarbonate with charged particles, and include cylindrical pores extending therethrough in the direction of the membrane thickness.

In the aforesaid asymmetrical membranes, however, the pores present in the dense layer generally have a wide pore diameter distribution and a very tortuous and complicated form. Moreover, these asymmetrical membranes are usually made by a wet process. For these reasons, these asymmetrical membranes have the disadvantage that, once dried, they undergo a structural change and hence exhibit a marked increase in filtering resistance. In order to avoid this, a complicated procedure is required which comprises treating the membranes with a special fluid such as glycerol and then drying them carefully. They are further disadvantageous in that their filtering resistance is high, the material to be filtered is easily retained within the pores of the dense layer, difficulties are encountered in removing the material retained with the pores to restore their filtering function, and hence their service life is short.

The aforesaid porous membranes having three-dimensionally interconnecting pores are characterized by excellent resistance to clogging. This is because, even if some pores become clogged, filtration can take place by other routes. However, they yet remain to be improved in some respects, because their fractionation accuracy is not satisfactorily high because of their volume filtration nature and because it is difficult to restore their filtering function.

The aforesaid membranes of the straight-pore type have the disadvantage that their surface pore density is limited to a maximum of 20% and, therefore, it is impossible to enhance their fluid permeability per unit membrane area. At present, porous membranes of the straight-pore type having a high surface pore density are not available.

SUMMARY OF THE INVENTION

Accordingly, it is an object of the present invention to provide a porous membrane which can overcome the above-described disadvantages of conventional porous membranes, has good storage stability, a narrow pore diameter distribution and a high surface pore density, and includes pores extending in a direction substantially perpendicular to the membrane surface.

According to the present invention, there is provided a porous membrane consisting of a film-forming polymer, characterized in that:

(a) in at least one surface thereof, pores extending in a direction substantially perpendicular to the membrane surface are present at a surface pore density of 20 to 80%, said pores having an average pore diameter within the range of 0.01 to 100 μm, a ratio of major to minor axis within the range of 1.0 to 2.0, and a coefficient of variation of pore diameter within the range of 0 to 50%; and (b) the overall porosity of said porous membrane is within the range of 20 to 90%.

DETAILED DESCRIPTION OF THE PREFERRED EMBODIMENTS

Figure 1:
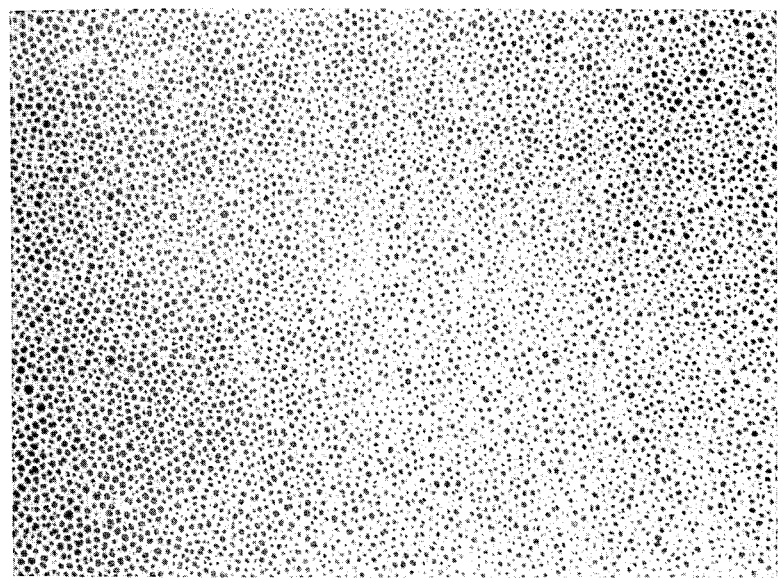
FIGS. 1, 2 and 3 are electron micrographs of the straight-pore layer surface, a cross-section and the void layer surface, respectively, of the asymmetrical membrane obtained in Example 3.
Figure 2:
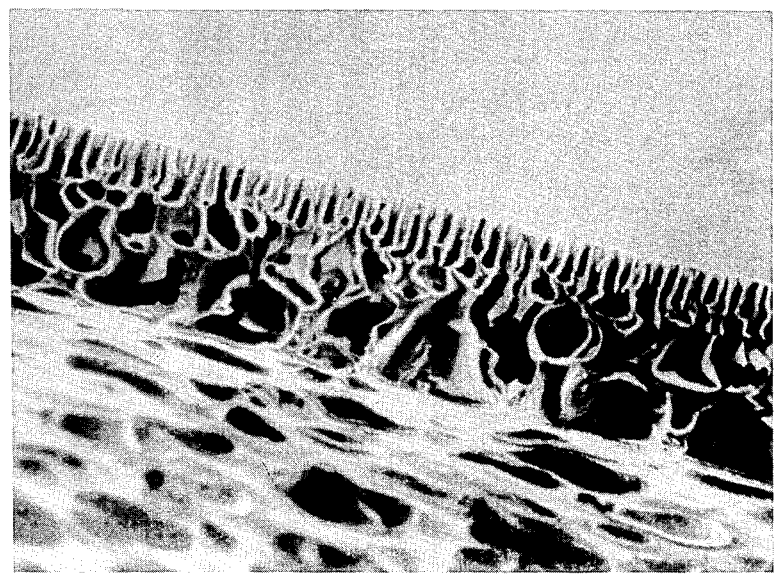
Figure 3:
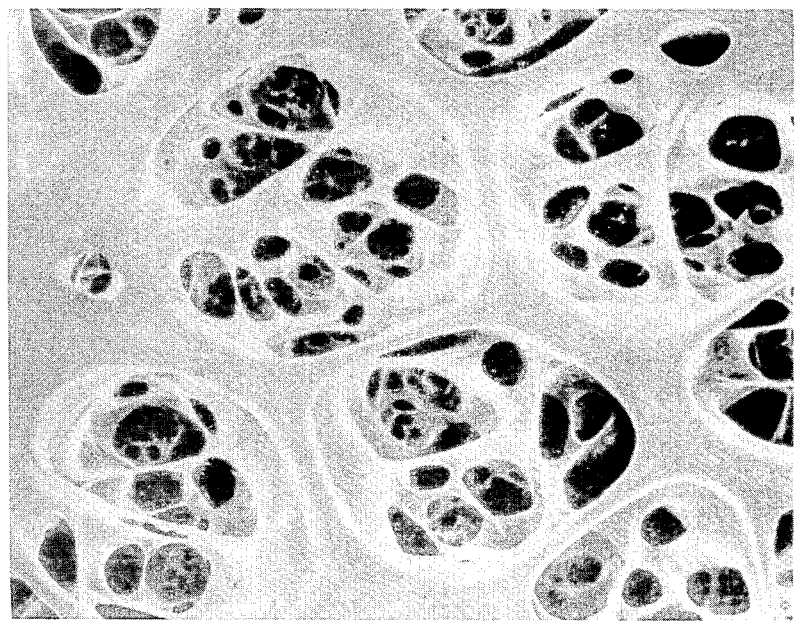

The porous membrane of the present invention has, in at least one surface thereof, pores extending in a direction substantially perpendicular to the membrane surface. As used herein, the expression "pores extending in a direction substantially perpendicular to the membrane surface" means pores having a tortuosity factor of 1.0 to 1.2 and a deviation ratio of 0.6 to 1.7 as measured in an arbitrary cross-section perpendicular to the membrane surface. Such pores will hereinafter be referred to as "straight pores".

The term "tortuosity factor" as used herein means the value of $l/l_0$ for each of the pores appearing in the aforesaid cross-section, where $l$ is the length of the curved or straight line extending through the center of the pore and $l_0$ is the thickness of the porous layer including straight pores (hereinafter referred to as "straight-pore layer").

The term "deviation ratio" as used herein means the value of $d/d_0$ for each of the straight pores appearing in the aforesaid cross-section, where $d_0$ is the width of the pore at the membrane surface and $d$ is the width of the pore at any position lying within the straight-pore layer.

If the deviation ratio is smaller than the aforesaid range, it is highly probable that the material to be filtered will be retained within the pores of the porous membrane, making it difficult to restore its filtering function and also reducing its fractionation accuracy. If it is greater than the aforesaid range, the distance between adjacent pores will become extremely small, making it difficult to enhance the surface porosity.

If the tortuosity factor is greater than the aforesaid range, the fluid permeability of the porous membrane may undesirably be reduced because of its increased resistance to the passage of fluids. Moreover, it is highly probable that the material to be filtered will be retained within the pores of the porous membrane, making it difficult to restore its filtering function.

It should be noted that a portion in which the tortuosity factor or the deviation ratio is outside the above ranges, is not included in the straight-pore. For example, asymmetrical membranes consisting of a straight-pore layer and a void layer have a structure in which the pore diameter changes gradually or rapidly from the interface of the two layers.

The deviation ratio is preferably within the range of 0.7 to 1.5 and more preferably within the range of 0.8 to 1.2. The tortuosity factor is preferably within the range of 1.0 to 1.1 and more preferably within the range of 1.0 to 1.05.

In the porous membrane of the present invention, the pores present in the surface of the straight-pore layer (hereinafter referred to as "surface pores") have a circular or elliptical shape, their ratio of major to minor axis is within the range of 1.0 to 2.0, and their coefficient of variation of pore diameter is within the range of 0 to 50%. Moreover, their average pore diameter is within the range of 0.01 to 100 $\mu$m.

For each surface pore, the arithmetic mean of its major and minor axes is taken to be the pore diameter of that surface pore. Then, the arithmetic mean of the pore diameters of N surface pores is taken to be the average pore diameter of surface pores. Usually, N is equal to 100.

The coefficient of variation of pore diameter is calculated from the measured pore diameters of surface pores according to the following equation:

Coefficient of variation of pore diameter =

(standard deviation/average pore diameter) $\times$ 100 (%)

If the ratio of major to minor axis is greater than 2.0, the fractionation characteristics of the porous membrane may undesirably be reduced when the particles of the material to be filtered have a nonspherical shape or undergo a change in shape during filtration. If the coefficient of variation of pore diameter is greater than 50%, the fractionation characteristics of the porous membrane may undesirably be reduced again. If the average pore diameter is smaller than 0.01 $\mu$m, the porous membrane will fail to exhibit a satisfactorily high permeability to fluids, and if it is larger than 100 $\mu$m, the porous membrane will be unsuitable for practical purposes.

Preferably, the coefficient of variation of pore diameter is within the range of 0 to 40%. The average pore diameter is preferably within the range of 0.01 to 10 $\mu$m and more preferably with the range of 0.01 to 5 $\mu$m.

No particular limitation is placed on the ratio of the thickness of the straight-pore layer ($l_0$) to the average pore diameter (D) of the straight pore. However, the ratio ($l_0$/D) should be about 0.1 or more. It is preferable that this ratio is 0.5 or more, more preferably 1.0 or more and most preferably 3.0 or more.

The ratio of major to minor axis and the average pore diameter can be determined by means of a scanning electron microscope.

The term "surface pore density" as used herein means the percentage of the combined area of the aforesaid surface pores to the total surface area of the membrane, and the surface pore density is within the range of 20 to 80%. If the surface pore density is less than 20%, the fluid permeability of the porous membrane will undesirably be reduced, and if it is greater than 80%, the porous membrane will be liable to damage because of its reduced strength. In consideration of the permeability and strength of the porous membrane, its surface pore density is preferably within the range of 30 to 80% and more preferably within the range of 35 to 75%.

The porous membrane of the present invention can take various forms. They include, for example, homogeneous membranes consisting entirely of a straight-pore layer as described above; asymmetrical membranes consisting of a straight-pore layer in one membrane surface and a void layer which comprises voids having larger pore diameters than that of the straight pores in another membrane surface; and heterogeneous membranes consisting of two straight-pore layers and a void layer disposed therebetween.

Although no particular limitation is placed on the thickness of the straight-pore layer, it is preferably of the order of about 0.01 to 50 $\mu$m. In the case of homogeneous membranes, the membrane thickness can have a value of the order of 5 $\mu$m to several millimeters, depending on the pore diameter of straight pores and the intended use of the membrane.

In asymmetrical membranes and heterogeneous membranes, the thickness of the straight-pore layer can likewise have a value of the order of 0.01 $\mu$m to several millimeters more preferably 0.1 to 50 $\mu$m and the overall thickness of the membrane can have a value of the order of 5 $\mu$m to several millimeters.

Where porous membranes are to be used as precision separating membranes, the membrane thickness may be of the order of 5 to 50 $\mu$m in the case of homogeneous membranes, and the thickness of the straight-pore layer may be of the order of 0.01 to 50 $\mu$m, more in the case of asymmetrical membranes and heterogeneous membranes. As stated above, the porous membrane of the present invention may have various pore structures. However, asymmetrical membranes consisting of a straight-pore layer in one membrane surface and a void layer which comprises voids having a larger pore diameter than that of straight-pores in another membrane surface are especially preferable because this make it easy to increase the fluid permeability and the handling quality is excellent.

The overall porosity (in percent by volume) of the porous membrane of the present invention is within the range of 20 to 90%. If the overall porosity is less than the aforesaid range, the fluid permeability of the porous membrane will undesirably be reduced, and if it is greater than the aforesaid range, the mechanical strength of the porous membrane will undesirably be reduced. The overall porosity is preferably within the range of 30 to 90% and more preferably within the range of 50 to 80%.

The overall porosity can be measured with a mercury porosimeter.

The term "film-forming polymer" as used herein comprises polymers which are soluble in organic solvents and insoluble in water and which can provide a castable solution. Examples of such polymers include fluorine-containing polymers (such as polyvinylidene fluoride, polytetrafluoroethylene copolymers and trifluoroethylene), polysulfones, polyethersulfones, polycarbonates, polyetherimides, polyethylene terephthalate, poly(meth)acrylic esters (such as polymethyl methacrylate and polybutyl (meth)acrylate), polyacrylonitrile, cellulose esters (such as cellulose acetate and cellulose nitrate), polyolefin (such as polyethylene, poly-4-methyl-1-pentene and polybutadiene), polyvinyl acetate, polystyrene, poly-$\alpha$-methylstyrene, poly-4-vinylpyridine, polyvinylpyrrolidone, polyvinyl chloride, polyvinylidene chloride, silicon polymers and polyphenylene oxides, as well as copolymers of the foregoing. Among them, polymers suitable for the intended purpose may be selected and used with due consideration for their thermal resistance, chemical resistance and other properties.

In the practice of the present invention, the above-enumerated polymers (including copolymers) may not only be used alone, but also be used in the form of a blend consisting of two or more polymers having mutual compatibility. Such blends have the advantage that, since the polymer components of a blend usually have different solubilities in a particular solvent, the structure of the resulting porous membrane can be elaborately controlled by utilizing this property. Examples of such blends include polymer alloys consisting of a vinylidene fluoride-tetrafluoroethylene copolymer/a polyalkyl (meth)acrylate, polyvinyl chloride/a polyalkyl (meth)acrylate, polystyrene/polybutadiene and a styrene-acrylonitrile copolymer/polyphenylene oxide.

Now, the method of making porous membranes in accordance with the present invention will be described hereinbelow. Although various processes may be used in the making of porous membranes in accordance with the present invention, one of the preferred ones is the vapor coagulation process which will be specifically described in the following.

The term "vapor coagulation process" as used herein means a process for producing porous membranes which comprises the steps of dissolving a film-forming polymer in a good solvent, forming a film of the resulting polymer solution, and forcibly contacting the saturated vapor or mist-containing vapor of a poor solvent with at least one surface of the film, the poor solvent being miscible with the good solvent and incapable of dissolving the polymer. Although the mist-containing vapor may comprise an unsaturated vapor, it preferably comprises a saturated vapor.

The liquid which produces such a saturated vapor or mist-containing vapor can be any liquid that serves as a poor solvent for the aforesaid film-forming polymer. One typical example thereof is water. In addition, there can also be used low-boiling organic solvents which can readily produce a vapor, such as methyl alcohol, ethyl alcohol, methyl ethyl ketone, acetone, tetrahydrofuran and ethyl acetate. However, in consideration of such factors as handling properties, working environmental conditions, safety and economy, it is preferable to use water.

In the following description, the wet coagulation process is illustrated in connection with the case in which the vapor is produced from water that constitutes a typical example of the liquid serving as a poor solvent for the polymer.

Thus, a porous membrane is made by supplying saturated steam or mist-containing steam to at least one surface of a film of the polymer solution.

Any conventional device may be used to supply steam while controlling its temperature and concentration. Usually, saturated steam having a pressure of several atmospheres is ejected from a nozzle and supplied to the surface of the film.

The content of the polymer in the polymer solution affects the overall porosity, pore diameter distribution and other properties of the resulting porous membrane, and the optimum content varies with the types of polymer and solvent used. However, the content preferably ranges from about 2 to 40% by weight and more preferably from 5 to 30% by weight.

The thickness of the film formed of the polymer solution may suitably be determined according to the thickness of the desired porous membrane. However, it usually ranges from about 10 to 2000 $\mu$m. Such a film can be formed by casting or spreading the above-defined polymer solution on a support body having a smooth surface, such as a glass plate, metal plate, plastic film, rotary drum or endless belt. So long as the smoothness of the resulting film is not impaired, porous support bodies such as porous plastic films may also be used for this purpose.

Moreover, such a film can also be formed into hollow fibers by properly determining the content of the polymer in the polymer solution and spinning it through a nozzle for the formation of hollow fibers.

Furthermore, if the polymer solution is allowed to flow down from a slit orifice, the film can be formed without using any support body.

Usually, the film so formed is immediately brought into contact with steam. However, the contact may be effected after a short lapse of time.

The good solvent used in the vapor coagulation process may be any of various solvents that can dissolve the above-defined film-forming polymer. However, if the good solvent is selected with due attention paid to the miscibility of the good solvent and water, a porous membrane having pores extending in a direction substantially perpendicular to the membrane surface can be made efficiently. Specifically, this can be done by using as the good solvent, a solvent having a solubility of not greater than about 50 g per 100 g of water at 20° C. The good solvent should have a solubility of greater than about 0.5 g per 100 g of water and preferably 5 g per 100 g of water at 20° C.

Examples of such solvents include ketones such as methyl ethyl ketone, diethyl ketone, methyl n-propyl ketone and methyl isobutyl ketone; acetic esters such as methyl acetate and ethyl acetate; formic esters such as methyl formate and ethyl formate; acrylic esters such as methyl acrylate; aromatic alcohols such as benzyl alcohol, phenol and cresol; halogenated hydrocarbons such as chloroform, dichloromethane and dichloroethane; diketones such as 2,4-pentanedione; and ethers such as diethyl ether. From among these solvents, a good solvent for the particular polymer may suitably be selected for use in the vapor coagulation process.

Although the mechanism by which a porous structure is created according to the vapor coagulation process has not been fully elucidated, one possible mechanism is as follows:

Where the good solvent used for the preparation of the polymer solution has a solubility in water (or poor solvent) which is equal to or lower than a predetermined level, the supply of steam to the surface of the film of the polymer solution produces, within the film, an aqueous phase containing a low proportion of the good solvent (hereinafter referred to as "the first phase") and a good solvent phase containing the polymer (hereinafter referred to as "the second phase"). The first phase forms islands, while the second phase forms a matrix. As the supply of steam (or water) proceeds, the first phase expands in the direction of the film thickness. Correspondingly, the good solvent present in the second phase gradually passes into the first phase. Thus, the reduced proportion of the good solvent in the second phase causes the polymer to precipitate and coagulate. Meanwhile, a part of the good solvent having passed into the first phase is eliminated from the system by flowing away together with the condensed water or by evaporation.

The above-described phase separation and the coagulation of the polymer proceed from the side of the film to which steam is supplied. Where the thickness of the film is small or the feed rate of steam is high, the coagulation of the polymer occurs almost simultaneously all over the film and, therefore, straight pores of substantially uniform size are formed throughout the whole thickness of the film. In contrast, where the thickness of the film is large or the feed rate of steam is low, the coagulation of the polymer proceeds slowly in the interior of the film and on the rear side thereof. During this period of time, the islands constituting the first phase unite with one another and increase in size to form large voids.

In the vapor coagulation process, a predetermined amount of steam is supplied to the surface of the film in a predetermined period of time.

The coagulation rate and coagulation behavior of the polymer vary according to the type of the polymer, the concentration of the polymer solution, the thickness of the film, the boiling point of the good solvent, the miscibility of the good solvent and water and other factors. Accordingly, the pore diameter, pore diameter distribution, porosity and other parameters can be adjusted to any desired values by properly determining steam supply conditions including its temperature, concentration, feed rate, supply time and other factors.

Usually, as the temperature of steam becomes higher and the feed rate (in $mg/sec \cdot cm^2$) of steam becomes higher, the resulting porous membrane tends to include straight pores having a larger length and a smaller pore diameter. Moreover, as the boiling point of the good solvent becomes lower, the resulting porous membrane tends to include straight pores having a smaller pore diameter.

The feed rate at which steam or mist-containing steam is supplied to the surface of the film should preferably be within the range of about 0.1 to 1000 $mg/sec \cdot cm^2$ and more preferably about 0.5 to 100 $mg/sec \cdot cm^2$. Steam or mist-containing steam should suitably be supplied for a time of about 10 minutes or less.

By the action of steam supplied to the surface of the film of the polymer solution, its polymeric constituent is coagulated to create a porous structure. In order to promote the coagulation of the polymer and prevent its redissolution, it is preferable to remove the good solvent from the film of the polymer solution or the resulting porous film during and/or after the supply of steam. The good solvent can be removed by evaporation or by allowing it to flow away in the form of a solution in the condensed water.

Where the good solvent remains in the interior of the porous film obtained after coagulation of the polymer, it can be removed, if necessary, by drying, washing with water, or other suitable means.

The vapor coagulation process will be more specifically described with reference to the accompanying drawings.

Figure 4:
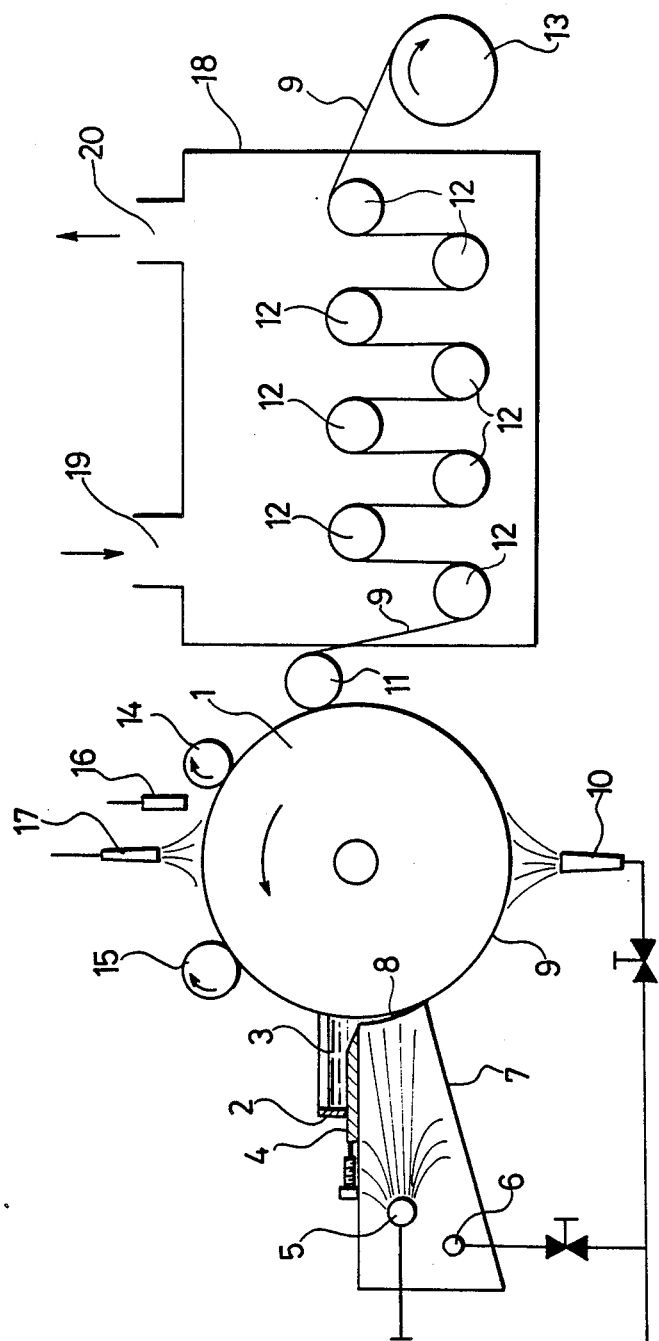
FIG. 4 is a schematic illustration of an apparatus suitable for use in the practice of the present invention and equipped with a rotary drum.

FIG. 4 illustrates an apparatus suitable for carrying out the vapor coagulation process.

In the apparatus illustrated in FIG. 4, while a rotary drum 1 is being rotated, a polymer solution placed in a reservoir 2 is continuously fed to the surface of the rotary drum. The rotary drum 1 is equipped with a temperature controlling jacket (not shown) and has a polished surface.

The thickness of the film of the polymer solution 3 formed on the surface of the rotary drum 1 is controlled by means of a knife coater 4. The resulting film of the polymer solution is made porous by supplying a stream of vapor of a poor solvent to the surface of the film from a poor solvent fluid supply nozzle 5 having a plurality of openings. At the same time, an air supply nozzle 6 may be operated to eject air therefrom and supply it, together with the aforesaid vapor, to the surface of the film.

As the film 9 which has been made porous travels with the rotary drum, the solvent is evaporated by exposure to air ejected from an air supply nozzle 10. Thereafter, the film is stripped from the rotary drum 1 by means of a roll 11, passed through a hot-air dryer 18 having a plurality of rolls 12 disposed therein, and then wound on a take up roll 13.

In FIG. 4, 7 denotes an enclosure, 8 a film of a polymer solution, 14 and 15 wiping rolls, 16 a washing nozzle, 17 an air supply nozzle, 19 a hot air inlet and 20 a hot air outlet.

Figure 5:
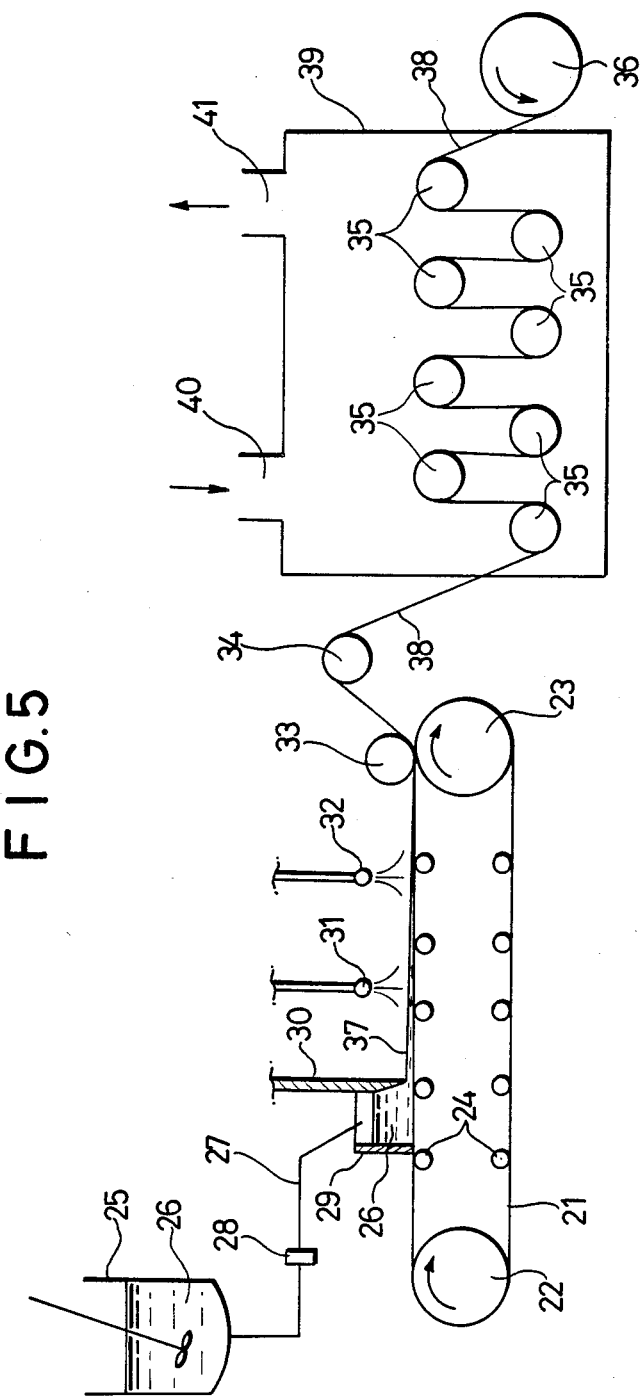
FIG. 5 is a schematic illustration of another apparatus suitable for use in the practice of the present invention and equipped with an endless belt.

FIG. 5 illustrates another apparatus suitable for carrying out the vapor coagulation process.

In the apparatus illustrated in FIG. 5, while an endless belt 21 is being driven by driving pulleys 22 and 23, a polymer solution is continuously fed to its top surface. The endless belt 21 is supported by a plurality of temperature-controllable rolls 24 and has a mirror-polished surface. Using a gear pump 28, the polymer solution is transferred through a feed pipe 27 to a reservoir 29 of the polymer solution located above the top surface of the endless belt. The thickness of the film 37 of the polymer solution formed on the top surface of the endless belt 21 is controlled by means of a knife coater 30. Then, the film of the polymer solution formed on the top surface of the endless belt 21 is made porous by supplying a stream of vapor of a poor solvent to the surface of the film from a poor solvent fluid supply nozzle 31 having a plurality of openings. Subsequently, the resulting porous film is exposed to air ejected from an air supply nozzle 32 so as to evaporate a part of the solvent present in the porous film. Thereafter, this porous film is stripped from the endless belt 21 by means of a roll 33, passed through a hot-air dryer 39 having a plurality of rolls 35 disposed therein, and then wound on a take-up roll 36 to obtain a porous membrane 38.

In FIG. 5, 25 denotes a storage tank, 26 a polymer solution, 34 a roll, 40 a hot air inlet and 41 a hot air outlet.

While the vapor coagulation process has been described with reference to several cases in which a porous membrane is continuously produced by using a moving support body, the porous membrane of the present invention can be made in both a batch process and a continuous process.

If it is desired to improve the water permeability of the porous membrane of the present invention, its pore walls may be held with a hydrophilic substance. The hydrophilic substance used for this purpose may be any substance that has an appropriate degree of hydrophilicity and can be strongly held on the pore walls. Examples of such substances include polymers composed of monomers having an HLB value of 2 to 20 and containing one or more polymerizable unsaturated bonds.

More specifically, these monomers include monomers having an HLB value of 2 to 20 and one or more polymerizable unsaturated bonds such as double bonds (e.g., vinyl linkage and allyl linkage) and triple bonds (e.g., acetylene linkage). In addition, they also include monomers in which the hydrophilic moiety comprises an ethylene oxide unit, a phosphoric ester unit, a sulfonic group or its salt, a hydroxyl group, a carboxyl group or its salt or a quarternary ammonium group, and the hydrophobic moiety comprises a hydrocarbon chain (e.g., methylene group, alkyl group, phenyl group, vinyl group, allyl group or acetylene linkage) or an alkylene oxide unit of 3 or more carbon atoms (e.g., propylene oxide unit or butene oxide unit). Moreover, diacetone acrylamide can also be used as the monomer.

A monomer as defined above and, if desired, a cross-linking monomer and a polymerization initiator are dissolved in a suitable solvent to prepare a solution. A porous membrane to be treated is soaked in this solution to cause the monomer to be held on its pore walls. Thereafter, the solvent is removed by, for example, evaporation and the monomer is polymerized according to any of the well-known polymerization techniques such as thermal polymerization. Thus, there can be obtained a porous membrane whose pore walls are held with a polymer having a hydrophilic nature.

The present invention is further illustrated by the following examples. In these examples, using electron micrographs (at a magnification of 1000–5000 diameters) made by a scanning electron microscope, the overall thickness of the resulting porous membrane and the thickness of its straight-pore layer were determined. Moreover, for each of 100 surface pores, their major and minor axes were measured to determine the average pore diameter. Furthermore, for each of 100 pores appearing in a cross-section, the values of $l$, $l_0$, $d$ and $d_0$ were measured and the coefficient of variation of pore diameter, tortuosity factor and deviation ratio were calculated therefrom according to the above-described equations.

The surface pore density of the membrane was determined by planimetry, and its overall porosity was measured with a mercury porosimester.

Air permeability was measured by establishing a differential pressure of 10 psi across the membrane.

EXAMPLE 1

60 parts of a copolymer consisting of tetrafluoroethylene and vinylidene fluoride in a molar ratio of 20:80 was dissolved in 40 parts of methyl methacrylate and the resulting solution was maintained in an atmosphere of nitrogen at 85° C. for 15 minutes to polymerize the methyl methacrylate. 100 parts of the polymer composition thus obtained was dissolved in 1900 parts of methyl ethyl ketone to prepare a polymer solution. Then, using a film casting applicator, this polymer solution was cast on a glass plate to a thickness of 254 μm to form a film thereof.

Thereafter, by opening the valve of a pipeline containing saturated steam at a pressure of 3 kg/cm², saturated steam was supplied to the surface of the film for 20 seconds from a nozzle disposed at 30 cm away from the film to coagulate the polymer. The amount of steam supplied through the pipeline was 267 g/min. Since the area of steam spreading region at a position 30 cm away from the nozzle was 177 cm² (15 cmφ), the feed rate of the steam was calculated to be 25 mg/sec·cm². When steam was supplied under the same conditions and its temperature was measured at a position 1 cm away from the film, it was found to be 83° C.

Thereafter, the coagulated polymer was dried by exposure to a stream of air at 25° C. for 1 minute, and then stripped from the glass plate to obtain a porous membrane having an asymmetrical structure. Using a scanning electron microscope, the surfaces of this porous membrane and its cross-sections perpendicular to the surfaces were examined.

In the surface contacted by steam, minute circular or elliptical pores having a uniform diameter and a ratio of major to minor axis of not greater than 2.0 were observed. On this side of the membrane, straight pores having a virtually unchanged diameter were observed in cross-sections perpendicular to the surface. In the area extending from the interior of the membrane to the other surface thereof, a void layer was observed. The pore diameters at the surface of the void layers ranged from 10 to 5 μm.

For each of 100 pores appearing in a cross-section of the straight-pore layer, its tortuosity factor was determined. For 100 pores present in the surface of the straight-pore layer, the ratio of major to minor axis, average pore diameter, coefficient of variation of pore diameter, and surface pore density were determined. In addition, the overall porosity of the porous membrane was determined. The results thus obtained are shown in Table 1.

EXAMPLES 2 AND 3

Porous membranes were made under the same conditions as described in Example 1, except that the feed rate of the steam was 17 mg/sec·cm² (Example 2) and 9.8 mg/sec·cm² (Example 3). The structural characteristics and other properties of these porous membranes were evaluated and the results of evaluation are shown in Table 1.

In both cases, there was obtained an asymmetrical membrane comprising a straight-pore layer and a void layer. The pore diameters at the surface of the void layer ranged from about 10 to 100 μm.

When the temperature of the steam was measured in the same manner as described in Example 1, it was found to be 56° C. (Example 2) and 44° C. (Example 3).

EXAMPLES 4 AND 5

Using a polymer solution composed of 100 parts of polymethyl methacrylate and 900 parts of methyl ethyl ketone, a film was formed in the same manner as described in Example 1.

Thereafter, porous membranes were made under the same conditions as described in Example 1, except that the feed rate of the steam was 10 mg/sec·cm² (Example 4) and 15 mg/sec·cm² (Example 5). The results of evaluation of these porous membranes are shown in Table 1.

EXAMPLE 6

A mixture of 60 parts of polyvinylidene fluoride, 60 parts of polymethyl methacrylate and 880 parts of methyl ethyl ketone was heated at 85° C. to prepare a polymer solution. Using this polymer, a film was formed in the same manner as described in Example 1.

Thereafter, a porous membrane was made under the same conditions as described in Example 1, except that steam was supplied at a feed rate of 17.2 mg/sec·cm² for 2 minutes. The results of evaluation of this porous membrane are shown in Table 1.

EXAMPLE 7

40 parts of a copolymer consisting of tetrafluoroethylene and vinylidene fluoride in a molar ratio of 20:80 was dissolved in 60 parts of methyl methacrylate and the resulting solution was maintained in an atmosphere of nitrogen at 85° C. for 15 minutes to polymerize the methyl methacrylate. 100 parts of the polymer composition thus obtained was dissolved in 1900parts of methyl ethyl ketone to prepare a polymer solution. Then, a film was formed in the same manner as described in Example 1.

Thereafter, a porous membrane was made under the same conditions as described in Example 1, except that steam was supplied to the surface of the film at a feed rate of 15 mg/sec·cm$^2$ for 45 seconds. When the temperature of the steam was measured in the same manner as described in Example 1, it was found to be 50° C.

The structural characteristics and other properties of the porous membrane thus obtained were evaluated and the results of evaluation are shown in Table 1.

EXAMPLES 8 TO 12

Using a polymer solution having each of the compositions shown in Table 2, porous membranes were made under the same conditions as described in Example 7, except that steam was supplied at a feed rate of 11 mg/sec·cm$^2$ for 4 minutes. The structural characteristics and other properties of these porous membranes were evaluated and the results of evaluation are shown in Table 1.

In all cases, there was obtained an asymmetrical membrane comprising a straight-pore layer and a void layer.

When the temperature of the steam was measured in the same manner as described in Example 1, it was found to be 44° C.

EXAMPLE 13

The polymer solution was prepared by dissolving, in 1565 parts of methyl ethyl ketone, 40 parts of a copolymer consisting of tetrafluoroethylene and vinylidine fluoride in a molar ration of 20:80 and 60 parts of polymethyl methacrylate.

An apparatus as illustrated in FIG. 4 was used in this example. This apparatus included a rotary drum 1 made of stainless steel and having a diameter of 300 mm and a width of 300 mm. The drum was equipped with a temperature controlling jacket disposed therein, and its surface temperature was adjusted to 20° C. In the horizontal plane containing the shaft of the drum, a knife coater 4 was disposed above the drum surface, as illustrated in FIG. 4. While the drum was being rotated at a speed of 0.1 rpm, a polymer solution was continuously cast thereon to a thickness of 250 μm. A steam supply nozzle 5, which comprised a straight pipe of 12.5 mm inside diameter having a plurality of holes of 4 mm diameter at intervals of 25 mm, was disposed at a position 30 cm away from the drum surface. Saturated steam having a pressure of 3 kg/cm$^2$ was ejected from this nozzle and supplied to the surface of the film at a rate of 1660 mg/sec over a surface area of about 300 cm$^2$.

Then, on the underside of the rotary drum, the resulting porous film 9 was predried by exposure to dry air ejected from an air supply nozzle 10. Further, on the side opposite to the knife coater, a free roll 11 was brought into contact with the rotary drum to strip the porous film from the rotary drum.

Finally, the porous film was passed through a dryer 18 kept at 50° C. and then wound on a take-up roll 13.

The structural characteristics and other properties of the porous membrane thus obtained were evaluated and the results of evaluation are shown in Table 1.

EXAMPLE 14

An apparatus as illustrated in FIG. 5 was used in this example. This apparatus included an endless belt 21 made of stainless steel and having an overall length of 2 m and a width of 330 mm. While the belt was being driven at a speed of 25 cm/min by driving pulleys 22 and 23 having a diameter of 250 mm, the same polymer solution as used in Example 1 was continuously fed to the surface of the belt. Thus, a film 37 of the polymer solution having a thickness of 250 μm was formed. A steam supply nozzle 31, which comprised a straight pip of 12.5 mm inside diameter having a plurality of holes of 4 mm diameter at intervals of 25 mm, was disposed at a position 15 cm above the belt surface. Saturated steam having a pressure of 3 kg/cm$^2$ was ejected from this nozzle and contacted with the film at a feed rate of 2.0 mg/sec·cm$^2$. Thus, the film was coagulated and made porous.

Then, the resulting porous film was exposed to air ejected from an air supply nozzle 32 so as to evaporate a part of the solvent present in the porous film. Thereafter, the porous film was stripped from the belt. Further, the porous film was dried in a hot-air dryer 39 kept at 60° C. and then wound on a take-up roll 36.

The structural characteristics and other properties of the porous membrane thus obtained were evaluated and the results of evaluation are shown in Table 1.

EXAMPLE 15

A porous membrane was made under the same conditions as described in Example 14, except that the feed rate of saturated steam was 5.0 mg/sec·cm$^2$. The results of evaluation of this porous membrane are shown in Table 1.

EXAMPLE 16

A porous membrane was made under the same conditions as described in Example 14, except that the feed rate of saturated steam was 15.0 mg/sec·cm$^2$. The results of evaluation of this porous membrane are shown in Table 1.

EXAMPLE 17

A porous membrane was made under the same conditions as described in Example 14, except that the steam supply nozzle 31 was disposed at a position 10 cm above the belt surface. The results of evaluation of this porous membrane are shown in Table 1.

EXAMPLE 18

A porous membrane was made under the same conditions as described in Example 14, except that a polymer solution prepared by dissolving 50 parts of polyacrylonitrile and 50 parts of polystyrene in 1900 parts of methyl ethyl ketone was used. The results of evaluation of this porous membrane are shown in Table 1.

EXAMPLE 19

A solution was prepared from 100 parts of H$_2$C=CHCOO(EO)$_{12}$(PO)$_{20}$(EO)$_{12}$COCH=CH$_2$ (where EO represents an ethylene oxide unit and PO represents a propylene oxide unit) having an HLB value of 10.3, 10 parts of benzoyl peroxide and 2000 parts of ethyl alcohol, and the porous membrane obtained in Example 1 was soaked in this solution for 3 seconds. Then, the soaked porous membrane was placed in an atmosphere of nitrogen and heated at 60° C. for 30 minutes.

The porous membrane so treated was mounted in a commercially available filter holder. When water was supplied to the straight-pore layer surface of the membrane under a pressure of 200 mmH$_2$O, water flowed out almost uniformly from the opposite surface.

When the untreated porous membrane of Example 1 was tested in the same manner as described above, water failed completely to pass through the porous membrane.

The porous membranes of the present invention can be utilized in a variety of fields according to type of polymer and the average pore diameter of the surface pores. For example, porous membranes having surface pores with an average pore diameter of about 0.01 to 5 μm can be utilized as precision filtering membranes for the removal of impurities, the recovery of useful components, and like purposes in various fields including water treatment, food production and medical applications. On the other hand, porous membranes having an average pore diameter of about 5 to 100 μm can be utilized as filtering membranes for the removal of coarse particles or as substrates for composite mem-

TABLE 1

| Example No. | Overall thickness (μm) | Thickness of straight-pore layer (μm) | Cross-section of straight-pore layer Deviation ratio | Cross-section of straight-pore layer Tortuosity factor | Surface of straight-pore layer Ratio of major to minor axis | Surface of straight-pore layer Average pore diameter (μm) | Surface of straight-pore layer Coefficient of variation of pore diameter (%) | Surface of straight-pore layer Surface pore density (%) | Pore diameters at the surface of void layer (μm) | overall porosity (%) | Air permeability (l/min · cm$^2$ · 10 psi) |
|---|---|---|---|---|---|---|---|---|---|---|---|
| Example 1 | 42 | 5 | 0.9–1.1 | 1.00–1.03 | 1.0–1.8 | 0.8 | 35 | 38 | 10–50 | 70 | — |
| Example 2 | 64 | 10 | " | 1.00–1.04 | 1.0–1.5 | 1.4 | 27 | 45 | 10–100 | 80 | — |
| Example 3 | 55 | 14 | " | " | 1.0–1.8 | 2.7 | 22 | 68 | " | 77 | — |
| Example 4 | 73 | 3 | 0.8–1.2 | 1.00–1.10 | 1.0–1.9 | 5.8 | 45 | 48 | 20–200 | 72 | — |
| Example 5 | 62 | 18 | " | " | " | 1.3 | 38 | 46 | 20–80 | 66 | — |
| Example 6 | 54 | 6 | " | 1.00–1.05 | 1.0–1.8 | 1.3 | 40 | 59 | 10–60 | 82 | — |
| Example 7 | 20 | 4 | 0.9–1.1 | 1.00–1.03 | " | 1.9 | 35 | 45 | 5–50 | 75 | 19.8 |
| Example 8 | 25 | 3 | 0.8–1.3 | 1.00–1.08 | 1.0–2.0 | 3.8 | 50 | 72 | 4–50 | 75 | 67.2 |
| Example 9 | 29 | 8 | 0.8–1.3 | 1.00–1.12 | " | 2.9 | 50 | 20 | 3–50 | 35 | 5.4 |
| Example 10 | 46 | 12 | 0.8–1.3 | 1.00–1.10 | " | 2.5 | 50 | 25 | 3–60 | 42 | 5.8 |
| Example 11 | 42 | 10 | 0.8–1.2 | 1.00–1.08 | 1.0–1.8 | 3.2 | 40 | 20 | 3–70 | 38 | 3.1 |
| Example 12 | 47 | 10 | 0.9–1.1 | 1.00–1.07 | 1.0–2.0 | 0.59 | 25 | 35 | 1–70 | 55 | 2.3 |
| Example 13 | 55 | 8 | " | 1.00–1.05 | 1.0–1.6 | 2.2 | 33 | 57 | 10–150 | 72 | — |
| Example 14 | 66 | 1 | " | " | 1.0–2.0 | 10 | 38 | 72 | 10–100 | 91 | — |
| Example 15 | 62 | 4 | " | " | 1.0–1.8 | 3.0 | 29 | 67 | " | 83 | — |
| Example 16 | 55 | 9 | " | " | 1.0–1.7 | 0.8 | 22 | 65 | 20–200 | 76 | — |
| Example 17 | 58 | 4 | " | " | 1.0–1.8 | 0.8 | 25 | 64 | " | 77 | — |
| Example 18 | 47 | 10 | 0.8–1.2 | 1.00–1.10 | 1.0–2.0 | 2.6 | 50 | 25 | 5–50 | 40 | — |

TABLE 2

| Example No. | Polymer | Solvent |
|---|---|---|
| Example 8 | Polymethyl methacrylate, 50 parts Acrylonitrile/styrene copolymer (50/50 molar ratio), 50 parts | Methyl ethyl Methyl ethyl |
| Example 9 | Polyphenylene oxide, 50 parts Acrylonitrile/styrene copolymer (50/50 molar ratio), 50 parts | Chloroform, 900 parts |
| Example 10 | Acrylonitrile/styrene copolymer (50/50 molar ratio), 100 parts | Ethyl acetate, 900 parts |
| Example 11 | Acrylonitrile/styrene copolymer (50/50 molar ratio), 100 parts | Chloroform, 900 parts |
| Example 12 | Polyphenylene oxide, 100 parts | Chloroform, 900 parts |

The porous membranes of the present invention have the following excellent features:

(1) Because of their narrow pore diameter distribution, they exhibit excellent performance characteristics in the fractionation of fine particles.

(2) They have a high surface pore density and hence a high fluid permeability per unit surface area.

(3) Since their pores extend in a direction substantially perpendicular to the membrane surface, they exhibit low resistance to the passage of fluids and hence a high fluid permeability. Moreover, there is little probability that the material to be filtered is retained within the porous membrane, and surface filtration essentially takes place. This facilitates washing operations to restore the filtering function of the membrane.

(4) Because of their good storage stability, they can be stored in a dry state without any alteration of their porous structure. This makes them easy to handle.

branes.

What is claimed is:

1. A porous membrane having a surface pore density greater than 20% per unit of membrane area to enhance fluid permeability, consisting of a acrylic ester polymer or a polymer blend containing a acrylic ester polymer, wherein:

(a) said membrane has a first major surface which consists of pores extending in a direction substantially perpendicular to said membrane first major surface and are present at a surface pore density of 35 to 75%, said pores having an average pore diameter within the range of 0.01 to 10 micrometers, a ratio of major to minor axes within the range of 1.0 to 2.0, a coefficient of variation of pore diameters within the range of 0 to 50%;

(b) said membrane has another major surface which consists of a void layer which comprises voids having a diameter larger than that of said pores; and (c) wherein the overall porosity of said porous membrane is within the range of 50 to 80%.

2. The porous membrane of claim 1, wherein at least a part of the pore surfaces have been made hydrophilic.

3. The porous membrane of claim 1, wherein the thickness of the porous layer including straight pores is within the range of 1 to 20 μm.

4. A porous membrane having a surface pore density greater than 20% per unit of membrane area to enhance fluid permeability, consisting of a polymer blend containing a acrylic ester polymer, and a fluorinated polyolefin or a copolymer of two or more fluorinated polyolefins, wherein:

(a) said membrane has a first major surface which consists of pores extending in a direction substantially perpendicular to said membrane first major surface and are present at a surface pore density of 35 to 75%, said pores having an average pore diameter within the range of 0.01 to 10 micrometers, a ratio of major to minor axes within the range of 1.0 to 2.0, a coefficient of variation of pore diameters within the range of 0 to 50%;

(b) said membrane has another major surface which consists of a void layer which comprises voids having a diameter larger than that of said pores; and (c) wherein the overall porosity of said porous membrane is within the range of 50 to 80%.

5. The porous membrane of claim 4, wherein at least a part of the pore surfaces have been made hydrophilic.

6. The porous membrane of claim 4, wherein the thickness of the porous layer including straight pores is within the range of 1 to 20 μm.

7. A porous membrane having a surface pore density greater than 20% per unit of membrane area to enhance fluid permeability, consisting of a copolymer of styrene or a derivative thereof and acrylonitrile or a derivative thereof, wherein:

(a) said membrane has a first major surface which consists of pores extending in a direction substantially perpendicular to said membrane first major surface and are present at a surface pore density of 35 to 75%, said pores having an average pore diameter within the range of 0.01 to 10 micrometers, a ratio of major to minor axes within the range of 1.0 to 2.0, and a coefficient of variation of pore diameters within the range of 0 to 50%;

(b) said membrane has another major surface which consists of a void layer which comprises voids having a diameter larger than that of said pores: and (c) wherein the overall porosity of said porous membrane is within the range of 50 to 80%.

8. The porous membrane of claim 7, wherein at least a part of the pore surfaces have been made hydrophilic.

9. The porous membrane of claim 7, wherein the thickness of the porous layer including straight pores is within the range of 1 to 20 μm.

* * * * *